US009350651B2

(12) United States Patent
Akisada et al.

(10) Patent No.: US 9,350,651 B2
(45) Date of Patent: May 24, 2016

(54) PACKET FORWARDING DEVICE AND WIRELESS COMMUNICATION SYSTEM

(71) Applicant: YOKOGAWA ELECTRIC CORPORATION, Musashino-shi, Tokyo (JP)

(72) Inventors: Yukiyo Akisada, Musashino (JP); Kazunori Miyazawa, Musashino (JP); Yasuki Sakurai, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 89 days.

(21) Appl. No.: 14/190,242

(22) Filed: Feb. 26, 2014

(65) Prior Publication Data

US 2014/0177518 A1 Jun. 26, 2014

Related U.S. Application Data

(63) Continuation of application No. PCT/JP2012/071899, filed on Aug. 29, 2012.

(30) Foreign Application Priority Data

Sep. 5, 2011 (JP) ................................. 2011-193264
Jul. 11, 2012 (JP) ................................. 2012-155650

(51) Int. Cl.
*H04L 12/721* (2013.01)
*H04W 40/00* (2009.01)
(Continued)

(52) U.S. Cl.
CPC .............. *H04L 45/32* (2013.01); *H04L 45/741* (2013.01); *H04W 40/00* (2013.01); *H04W 92/02* (2013.01)

(58) Field of Classification Search
CPC ............ H04B 7/14; H04H 1/00; H04L 12/28; H04L 12/721; H04L 45/32; H04M 3/00; H04W 4/00
See application file for complete search history.

(56) References Cited

U.S. PATENT DOCUMENTS

2004/0229614 A1* 11/2004 Kim et al. ................... 455/435.1
2005/0169270 A1* 8/2005 Mutou et al. ................... 370/390

(Continued)

FOREIGN PATENT DOCUMENTS

JP 7-79249 A 3/1995
JP 2004-193878 A 7/2004

(Continued)

OTHER PUBLICATIONS

"ISA-100.11a-2009 Wireless systems for industrial automation: Process control and related applications", 14 Provisioning. pp. 666-693.

(Continued)

*Primary Examiner* — Andrew Lai
*Assistant Examiner* — Leon Andrews
(74) *Attorney, Agent, or Firm* — Sughrue Mion, PLLC

(57) ABSTRACT

A packet forwarding device performs forwarding of a packet between first and second wireless communication networks to which different identifiers are attached, and includes: a relay network that is interposed between the first and second wireless communication networks; a first processing unit that is connected to the first wireless communication network and performs first routing control by using first routing information in which the first wireless communication network and the relay network are defined as outgoing interfaces; and a second processing unit that is connected to the second wireless communication network and performs second route control by using second routing information in which the second wireless communication network and the relay network are defined as outgoing interfaces.

13 Claims, 14 Drawing Sheets

(51) Int. Cl.
*H04L 12/56* (2006.01)
*H04W 92/02* (2009.01)

(56) References Cited

U.S. PATENT DOCUMENTS

2006/0285510 A1* 12/2006 Kim et al. .................. 370/312
2009/0213779 A1* 8/2009 Zhang et al. ................ 370/315
2011/0110291 A1 5/2011 Ishii

FOREIGN PATENT DOCUMENTS

JP 2008-259203 A 10/2008
WO 2009/130941 A1 10/2009

OTHER PUBLICATIONS

International Search Report for PCT/JP2012/071899 dated Oct. 16, 2012.

* cited by examiner

FIG. 3

| DESTINATION ADDRESS | NEXT HOP | HOP LIMIT | OUTGOING INTERFACE |
|---|---|---|---|
| SYSTEM MANAGER | BACKBONE ROUTER | 2 | WIRELESS SUB-NETWORK (TARGET NETWORK) |
| BACKBONE ROUTER | BACKBONE ROUTER | 1 | WIRELESS SUB-NETWORK (TARGET NETWORK) |
| PACKET FORWARDING DEVICE (NETWORK INTERFACE UNIT 21b) | PACKET FORWARDING DEVICE (NETWORK INTERFACE UNIT 21b) | 1 | BACKBONE NETWORK (VIRTUAL NETWORK) |
| WIRELESS DEVICE | PACKET FORWARDING DEVICE (NETWORK INTERFACE UNIT 21b) | 2 | BACKBONE NETWORK (VIRTUAL NETWORK) |

FIG. 4

| DESTINATION ADDRESS | NEXT HOP | HOP LIMIT | OUTGOING INTERFACE |
|---|---|---|---|
| SYSTEM MANAGER | PACKET FORWARDING DEVICE (NETWORK INTERFACE UNIT 21a) | 3 | BACKBONE NETWORK (VIRTUAL NETWORK) |
| BACKBONE ROUTER | PACKET FORWARDING DEVICE (NETWORK INTERFACE UNIT 21a) | 2 | BACKBONE NETWORK (VIRTUAL NETWORK) |
| PACKET FORWARDING DEVICE (NETWORK INTERFACE UNIT 21b) | PACKET FORWARDING DEVICE (NETWORK INTERFACE UNIT 21a) | 1 | BACKBONE NETWORK (VIRTUAL NETWORK) |
| WIRELESS DEVICE | WIRELESS DEVICE | 1 | WIRELESS SUB-NETWORK (PROVISIONING NETWORK) |

PACKET FORWARDING DEVICE AND WIRELESS COMMUNICATION SYSTEM

CROSS REFERENCE TO RELATED APPLICATIONS

This application is a continuation application based on a PCT Patent Application No. PCT/JP2012/071899, filed Aug. 29, 2012, whose priority is claimed on Japanese Patent Application No. 2011-193264, filed on Sep. 5, 2011 and Japanese Patent Application No. 2012-155650, filed on Jul. 11, 2012, the entire content of which are hereby incorporated by reference.

BACKGROUND OF THE INVENTION

1. Field of the Invention

The present invention relates to a packet forwarding device capable of forwarding packets between wireless communication networks and a wireless communication system including the packet forwarding device.

2. Description of the Related Art

In recent years, wireless communication systems in which field equipments (sensors or actuators), called wireless field devices, capable of performing wireless communication are installed and communication is performed via wireless communication networks based on control signals used to control the wireless field devices or measurement signals or the like obtained with the wireless field devices are being implemented in plants, factories, or the like. As a communication standard used in such wireless communication systems, ISA100.11a which is a wireless communication standard for industrial automation developed by the International Society of Automation (ISA) can be exemplified.

A wireless communication system according to the foregoing wireless communication standard, ISA100.11a, includes a field device, a backbone router that forms a wireless communication network with the field device, and a system manager that generally controls the wireless communication performed via the wireless communication network. Under the control of the system manager, the wireless communication is performed according to Time Division Multiple Access (TDMA) using a plurality of communication channels (for example, 16 channels).

Here, to allow the foregoing wireless field device to participate in the wireless communication network, an operation of setting device information (a network parameter and security parameter), called "provisioning," is required to be performed on the wireless field device. Methods of performing the "provisioning" are broadly classified into Over The Air (OTA) provisioning in which the device information is set by performing wireless communication in conformity with the foregoing wireless communication standard, ISA100.11a, and Out-Of-Band (OOB) provisioning in which the device information is set by performing communication by communication means (for example, infrared communication) different from the wireless communication.

In "ISA-100.11a-2009 Wireless systems for industrial automation: Process control and related applications", 14 Provisioning, pp. 666 to 693, as a method of performing the foregoing OTA provisioning, a method of performing the provisioning using a dedicated tool (provisioning device) for provisioning and a method of performing the provisioning without using the dedicated tool are defined. Specifically, the former method is a method of setting device information by installing another wireless communication network (provisioning network) physically separated from a wireless communication network (target network) in which a wireless field device participates and performing wireless communication between a tool and the wireless field device via the provisioning network. On the other hand, the latter method is a method of constructing a logically separated provisioning network on a target network and setting device information in a field device via the provisioning network from the target network.

In a wireless communication system, however, a method of dividing a wireless communication network into a plurality of small wireless communication networks (wireless sub-networks) and managing the small wireless communication networks is generally used from the viewpoint of communication resource distribution or effective management. The divided wireless sub-networks are managed by attaching different identifiers (subnet ID). Therefore, the target network and the provisioning network described above are managed by attaching different subnet IDs.

The above-described wireless communication standard, ISA100.11a, defines the details of a structure (specifically, transmission by the data link layer of the OSI reference model) in which packets are forwarded within one wireless sub-network in which subnet IDs are the same, but does not define details of a structure in which packets are forwarded between wireless sub-networks to which different subnet IDs are attached. For this reason, packets are not forwarded between a target network and a provisioning network to which different subnet IDs are attached. In the end, the OTA provisioning in which the above-described provisioning device is not used may not be realized.

Here, when routing control is performed with the network layer located above the data link layer of the OSI reference model, forwarding of packets between wireless sub-networks with different subnet IDs can be considered to be possible. In the above-described wireless communication standard, ISA100.11a, however, a wireless communication network and a core network called a "backbone network" are merely distinguished from each other in a routing table used for routing control of the network layer. For this reason, to distinguish individual wireless sub-networks that form a wireless communication network, the routing table used for the routing control of the network layer is required to be considerably modified.

As described above, since the system manager generally controls the wireless communication performed via the wireless communication network in the wireless communication standard, ISA100.11a, the above-described routing table can be generated by a system manager and can be assigned to a field device. Accordingly, when the above-described routing table is modified, it is also necessary to modify a communication protocol used to assign wireless communication resources defined in the routing table, and thus the wireless communication standard, ISA100.11a, is required to be modified.

SUMMARY

The present invention provides a packet forwarding device capable of realizing packet forwarding between wireless communication networks without modifying a wireless communication standard and a wireless communication system including the packet forwarding device.

A packet forwarding device in accordance with a preferred embodiment of the present invention performs forwarding of a packet between first and second wireless communication networks to which different identifiers are attached, and includes: a relay network that is interposed between the first and second wireless communication networks; a first processing unit that is connected to the first wireless communication network, the first processing unit performing first routing control by using first routing information in which the first wireless communication network and the relay network are defined as packet output destinations; and a second processing unit that is connected to the second wireless communication network, the second processing unit performing second routing control by using second routing information in which the second wireless communication network and the relay network are defined as packet output destinations.

Each of the first routing information and the second routing information may be a table in which a next hop, a hop limit, and an outgoing interface are defined for each ending point address.

The relay network may be a virtual network which virtually connects the first processing unit to the second processing unit.

The relay network may be an actual network which physically connects the first processing unit to the second processing unit.

The first and second processing units may be installed as separate devices, when connected to the relay network.

A wireless communication system in accordance with a preferred embodiment of the present invention performs wireless communication via first and second wireless communication networks to which different identifiers are attached, and includes a control device configured to perform control of the wireless communication performed via the first and second wireless communication networks; and the packet transmission device that transmits packets between the first and second wireless communication networks.

The control device may generate the first routing information and the second routing information used in the first and second processing units based on information indicating connection relations between the first and second wireless communication networks, and the relay network and the first and second processing units of the packet transmission devices.

The wireless communication system may further include: a first router device that is connected to the main network to which the control device is connected and the first wireless communication network.

The wireless communication system may further include: a second router device that is connected to the main network and the second wireless communication network.

The first wireless communication network may be a currently used wireless communication network in which a participating wireless device performs wireless communication under control of the control device, and the second wireless communication network may be an auxiliary wireless communication network in which participation information necessary to allow the wireless device to participate in the first wireless communication network is set in the wireless device to be allowed to participate in the first wireless communication network.

The control device may perform a participation process of allowing the wireless device to participate in the first and second wireless communication networks and a setting process of setting the participation information on the wireless device participating in the second wireless communication network.

Both of the first and second wireless communication networks may be currently used wireless communication networks in which the participating wireless device performs the wireless communication under control of the control device.

The first processing unit of the packet forwarding device may transmit information used to connect the wireless device to the first wireless communication network as a first advertisement to the first wireless communication network under control of the control device. The second processing unit of the packet forwarding device may transmit information used to connect the wireless device to the second wireless communication network as a second advertisement to the second wireless communication network under the control of the control device.

According to a preferred embodiment of the prevent invention, the first processing unit performs the first routing control using the first routing information in which the first wireless communication network and the relay network are defined as the packet output destinations and the second processing unit performs the second routing control using the second routing information in which the second wireless communication network and the relay network are defined as the packet output destinations. Accordingly, it is possible to realize the packet forwarding between the wireless communication networks without a considerable modification in the routing table used in the route control. Thus, it is possible to realize the packet forwarding between the wireless communication networks without a change in a wireless communication standard.

BRIEF DESCRIPTION OF THE DRAWINGS

FIG. 3 is a diagram illustrating content of a routing table T1 used in the packet forwarding device in accordance with the first preferred embodiment of the present invention.

FIG. 4 is a diagram illustrating content of a routing table T2 used in the packet forwarding device in accordance with the first preferred embodiment of the present invention.

DETAILED DESCRIPTION OF THE PREFERRED EMBODIMENTS

Hereinafter, a packet forwarding device and a wireless communication system in accordance with preferred embodiments of the present invention will be described in detail with reference to the drawings.
(First Preferred Embodiment)
(Wireless Communication System)

Figure 1:
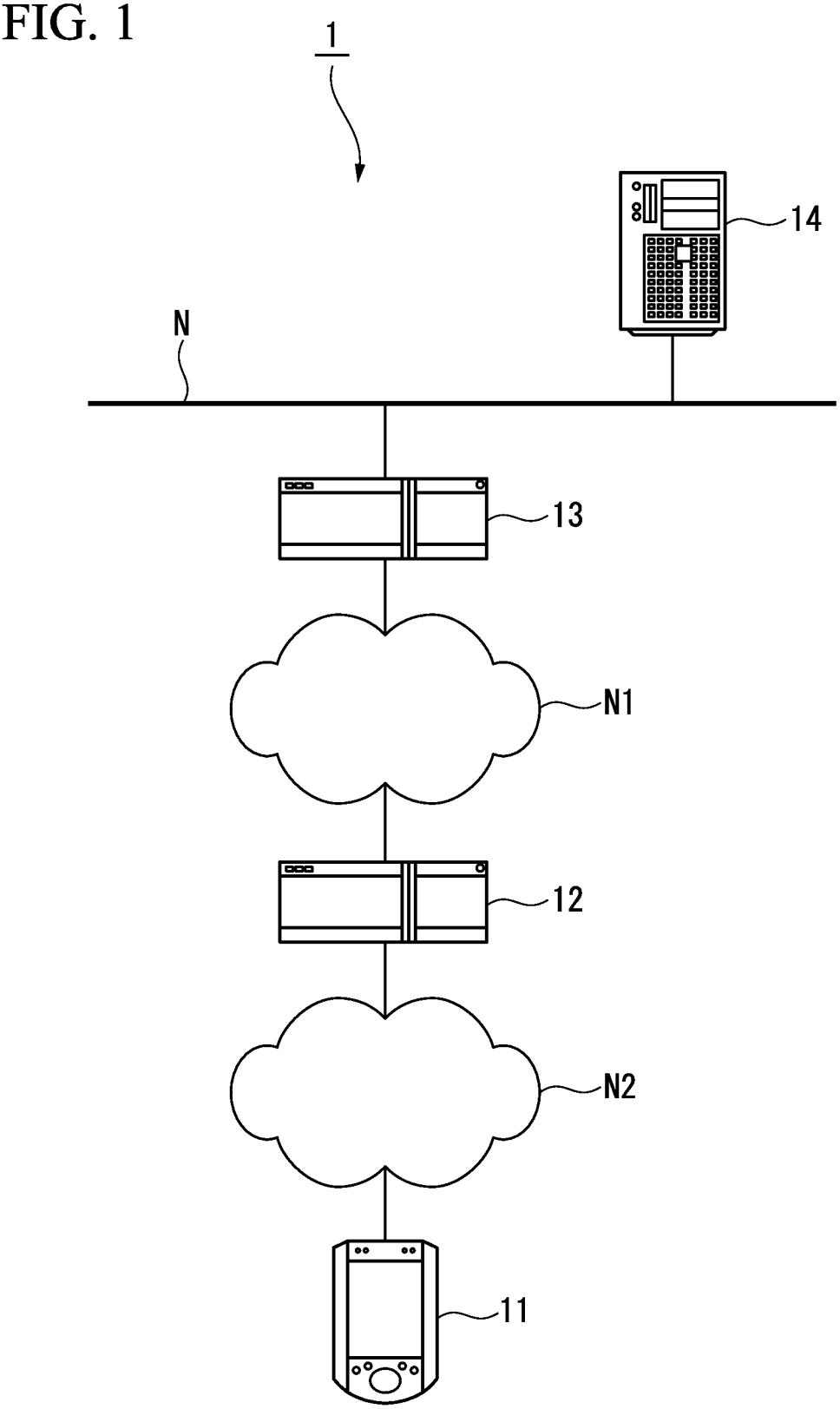
FIG. 1 is a block diagram illustrating an overall configuration of a wireless communication system in accordance with a first preferred embodiment of the present invention.

FIG. 1 is a block diagram illustrating an overall configuration of a wireless communication system in accordance with a first preferred embodiment of the present invention. As illustrated in FIG. 1, a wireless communication system 1 in accordance with the first preferred embodiment includes a wireless device 11, a packet forwarding device 12, a backbone router 13 (first router device), and a system manager 14 (control device). The wireless communication system 1 can perform wireless communication (for example, wireless communication between the wireless device 11 and the backbone router 13) via a target network N1 (and the provisioning network N2) under the control of the system manager 14. In FIG. 1, only one wireless device 11 is illustrated, but any number of wireless devices can be used.

Here, a target network N1 (first wireless communication network) is a primary wireless communication network formed in the wireless communication system 1. That is, the target network N1 can be said to be a currently used wireless communication network in which wireless communication is performed by participant wireless devices. A provisioning network N2 (second wireless communication network) is an auxiliary wireless communication network installed so that Over The Air (OTA) provisioning is performed to allow the wireless device 11 to participate in the target network N1. That is, the provisioning network N2 can also be said to be an auxiliary wireless communication network configured to set provisioning information (participation information) necessary for the wireless device 11 to participate in the target network N1 in the wireless device 11 which will participate in the target network N1. A backbone network N (main network) to which the system manager 14 is connected is a core network of the wireless communication system 1.

Either the foregoing target network N1 or the provisioning network N2 is a wireless sub-network that forms a wireless communication network installed in the wireless communication system 1. Different subnet IDs (identifiers) are attached to the target network N1 and the provisioning network N2. For example, a subnet ID with a value of "1" is attached to the provisioning network N2 and a subnet ID with a value of one of "2" to "65535 (0xFFFF)" is attached to the target network N1.

The wireless device 11 is, for example, a sensor device such as a flowmeter or a temperature sensor, a valve device such as a flow control valve or an on-off valve, an actuator device such as a fan or a motor, or another wireless field device installed in a plant or a factory. The wireless device 11 performs wireless communication in conformity with ISA100.11a which is a wireless communication standard for industrial automation. The wireless device 11 participates in the provisioning network N2 when performing the OTA provisioning and participates in the target network N1 under the control of the system manager 14 after performing the OTA provisioning.

The packet forwarding device 12 can perform wireless communication in conformity with the foregoing wireless communication standard, ISA100.11a, and is connected to the target network N1 and the provisioning network N2 to forward packets. Specifically, the packet forwarding device 12 performs packet forwarding within the target network N1, packet forwarding within the provisioning network N2, and packet forwarding between the target network N1 and the provisioning network N2.

Under the control of the system manager 14, the packet forwarding device 12 transmits an advertisement (first advertisement) to the target network N1 and transmits an advertisement (second advertisement) to the provisioning network N2. Here, the advertisement transmitted to the target network N1 is information used to connect the wireless device 11 to the target network N1. The advertisement transmitted to the provisioning network N2 is information used to connect the wireless device 11 to the provisioning network N2. The packet forwarding device 12 will be described in detail below.

The backbone router 13 is a device that connects the target network N1 to the backbone network N to which the system manager 14 is connected and that, for example, performs relay of various kinds of data transmitted and received between the wireless device 11 and the system manager 14. The backbone router 13 also performs wireless communication in conformity with the foregoing wireless communication standard, ISA100.11a.

The system manager 14 generally performs management control of the wireless communication system 1. For example, the system manager 14 controls wireless communication performed via the target network N1 (and the provisioning network N2 to which the packet forwarding device 12 is connected) to which the backbone router 13 is connected. Specifically, assignment control of wireless communication resources (time slots and communication channels) to the wireless device 11, the packet forwarding device 12, and the backbone router 13 is performed and wireless communication is realized via the target network N1 (and the provisioning network N2) according to the TDMA.

The system manager 14 performs a process (participation process) of allowing or not allowing the wireless device 11 to participate in the target network N1 or the provisioning network N2 and a process (OTA provisioning (provisioning via the provisioning network N2); a setting process) of setting provisioning information (information necessary to allow the wireless device 11 to participate in the target network N1) on the wireless device 11. Further, the system manager 14 performs a process of allowing the packet forwarding device 12 to participate in the target network N1 and the provisioning network N2.

The system manager 14 assigns the wireless communication resources relevant to the above-described advertisements to the packet forwarding device 12. Specifically, the system manager 14 assigns the wireless communication resources used to transmit each of the advertisement toward the target network N1 and the advertisement toward the provisioning network N2 by the packet forwarding device 12 and assigns the wireless communication resources used for the packet forwarding device 12 to receive a connection request from the wireless device 11 receiving each advertisement. The assignment of the wireless communication resources relevant to the advertisements will be described in detail below.

The system manager 14 identifies a connection relation between each of the devices (the wireless device 11 to the system manager 14) included in the wireless communication system 1 and the networks (the target network N1, the provisioning network N2, and the backbone network N) installed in the wireless communication system 1 and generates routing information (routing table) used by the packet forwarding device 12 based on information indicating the connection relation. The routing information (routing table) used by the packet forwarding device 12 and a method of generating the routing information will be described in detail below.

(Packet Forwarding Device)

Figure 2:
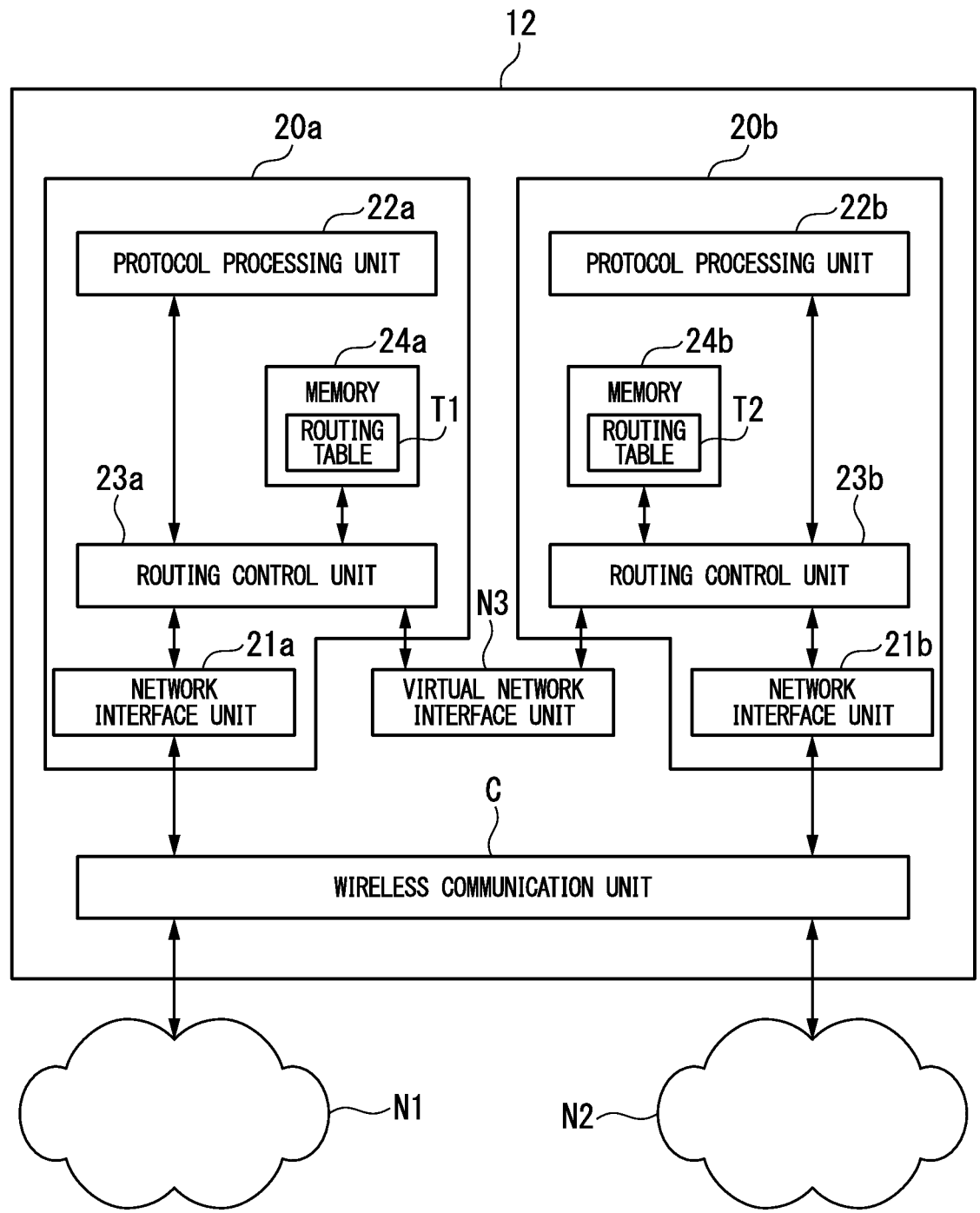
FIG. 2 is a block diagram illustrating the configuration of main units of a packet forwarding device in accordance with the first preferred embodiment of the present invention.

FIG. 2 is a block diagram illustrating the configuration of main units of the packet forwarding device in accordance with the first preferred embodiment of the present invention. As illustrated in FIG. 2, the packet forwarding device 12 in accordance with the first preferred embodiment includes a target network side processing unit 20a (first processing unit), a provisioning network side processing unit 20b (second processing unit), a virtual network interface unit N3 (relay network), and a wireless communication unit C. The target network side processing unit 20a and the provisioning network side processing unit 20b are connected to each other via the virtual network interface unit N3.

The target network side processing unit 20a and the provisioning network side processing unit 20b are connected to the target network N1 and the provisioning network N2 via the wireless communication unit C, respectively. The wireless communication unit C receives wireless signals from the target network N1 and the provisioning network N2 and outputs the received signals to the target network side processing unit 20a and the provisioning network side processing unit 20b. Further, signals from the target network side processing unit 20a and the provisioning network side processing unit 20b are configured as wireless signals and are transmitted to the target network N1 and the provisioning network N2. FIG. 2 illustrates a configuration in which one wireless communication unit C shared by the target network side processing unit 20a and the provisioning network side processing unit 20b is installed in the packet forwarding device 12. However, a plurality of wireless communication units corresponding to the target network side processing unit 20a and the provisioning network side processing unit 20b may be installed in the packet forwarding device 12.

Here, the virtual network interface unit N3 indicates an interface for an imaginary network (virtual network) that connects the target network side processing unit 20a to the provisioning network side processing unit 20b. The virtual network interface unit N3 is realized by, for example, a connection line that connects the target network side processing unit 20a to the provisioning network side processing unit 20b. Further, when the target network side processing unit 20a and the provisioning network side processing unit 20b are realized by software, the virtual network interface unit N3 is realized by communication means (for example, inter-process communication) for managing communication therebetween.

The target network side processing unit 20a includes a network interface unit 21a, a protocol processing unit 22a, a routing control unit 23a, and a memory 24a. The target network side processing unit 20a is connected to the target network N1 via the wireless communication unit C and processes packets input and output via the target network N1. Specifically, routing control is performed using a routing table T1 (first routing information) in which the target network N1 and the virtual network interface unit N3 are defined as outgoing interfaces. Further, the target network side processing unit 20a also performs a process of transmitting an advertisement destined for the target network N1.

The network interface unit 21a is connected to the target network N1 via the wireless communication unit C. The network interface unit 21a inputs and outputs packets transmitted to the packet forwarding device 12 via the target network N1 and packets to be transmitted from the packet forwarding device 12 via the target network N1. The protocol processing unit 22a processes packets transmitted and received in conformity with a protocol defined in the wireless communication standard, ISA100.11a. For example, a process of generating packets for which the target network side processing unit 20a is a source point is performed and a process of receiving packets for which the target network side processing unit 20a is a destination point is performed. The protocol processing unit 22a performs a process of transmitting an advertisement destined for the target network N1 described above.

The routing control unit 23a performs routing control of packets to be transmitted by retrieving a next hop from the routing table T1 stored in the memory 24a. Specifically, output of the packets to the network interface unit 21a or output of the packets to the virtual network interface unit N3 is controlled according to the content of the routing table T1. The memory 24a is realized by, for example, a volatile storage element such as a random access memory (RAM) and stores the foregoing routing table T1.

FIG. 3 is a diagram illustrating content of the routing table T1 used by the packet forwarding device in accordance with the first preferred embodiment of the present invention. As illustrated in FIG. 3, the routing table T1 is a table in which a next hop, a hop limit, and an outgoing interface are defined for each destination address (a device indicated as the final destination of a packet). In the first preferred embodiment, the case in which the routing table T1 has a table format will be described to facilitate the description. However, the routing table may not necessarily have the table format.

In the routing table T1, when the destination address is the "system manager" or the "backbone router," the "backbone router" is defined as the next hop and a "wireless sub-network (target network) is defined as the outgoing interface. On the other hand, when the destination address is a "packet forwarding device (network interface unit 21b) or the "wireless device," the "packet forwarding device (network interface unit 21b" is defined as the next hop and the "backbone network (virtual network)" is defined as the outgoing interface.

That is, in the routing table T1, when the destination address is present on the side of the target network N1, the "wireless sub-network (target network)" is set as the outgoing interface. On the other hand, when the destination address is present on the side of the virtual network interface unit N3, the "backbone network (virtual network")" is set as the outgoing interface.

Here, in the above-described wireless communication standard, ISA100.11a, routing information (routing table) used for routing control of the network layer is basically information used to distinguish the "wireless communication network" form the "backbone network" and wireless sub-networks with different subnet IDs may not be distinguished from each other. In the first preferred embodiment, to realize the packet forwarding between the target network N1 and the provisioning network N2 with different subnet IDs without a considerable modification in the routing table T1, the routing control unit 23a analyzes the "wireless sub-network (wireless communication network)" defined in the routing table T1 as the target network N1 which is one of the wireless sub-networks and analyzes the "backbone network" as a virtual network.

The provisioning network side processing unit 20b includes a network interface unit 21b, a protocol processing unit 22b, a routing control unit 23b, and a memory 24b, is connected to the provisioning network N2 via the wireless communication unit C, and processes packets input and output via the provisioning network N2. Specifically, routing control is performed using a routing table T2 (second routing information) in which the provisioning network N2 and the virtual network interface N3 are defined as the outgoing interface. Further, the provisioning network side processing unit 20b also performs a process of transmitting an advertisement destined for the provisioning network N2.

The network interface unit 21b is connected to the provisioning network N2 via the wireless communication unit C, and thus inputs and outputs packets transmitted to the packet forwarding device 12 via the provisioning network N2 and packets to be transmitted from the packet forwarding device 12 via the provisioning network N2. The protocol processing unit 22b processes packets transmitted and received in conformity with the protocol defined in the wireless communication standard, ISA100.11a. For example, a process of generating packets in which the provisioning network side processing unit 20b is a source point is performed and a process of receiving packets in which the provisioning network side processing unit 20b is a destination point is performed. Further, the protocol processing unit 22b performs a process of transmitting an advertisement destined for the above-described provisioning network N2.

The routing control unit 23b performs routing control of packets to be transmitted by retrieving a next hop from the routing table T2 stored in the memory 24b. Specifically, output of the packets to the network interface unit 21b or output of the packets to the virtual network interface unit N3 is controlled according to the content of the routing table T2. The memory 24b is realized by, for example, a volatile storage element such as a RAM and stores the foregoing routing table T2.

FIG. 4 is a diagram illustrating content of the routing table T2 used by the packet forwarding device in accordance with the first preferred embodiment of the present invention. As illustrated in FIG. 4, like the routing table T1, the routing table T2 is a table in which a next hop, a hop limit, and an outgoing interface are defined for each destination address (a device indicated as the final destination of a packet). Like the routing table T1, the routing table T2 may not necessarily have a table format.

In the routing table T2, when the destination address is the "system manager", the "backbone router," and the "packet forwarding device (network interface unit 21a)," the "packet forwarding device (network interface unit 21a" is defined as the next hop and the "backbone network (virtual network)" is defined as the outgoing interface. On the other hand, when the destination address is the "wireless device," the "wireless device" is defined as the next hop and the "wireless sub-network (provisioning network)" is defined as the outgoing interface.

That is, in the routing table T2, the "backbone network (virtual network)" is set as the outgoing interface when the destination address is present on the side of the virtual network interface unit N3. On the other hand, when the destination address is present on the side of the provisioning network N2, the "wireless sub-network (provisioning network)" is set as the outgoing interface. That is, in the first preferred embodiment, to realize the packet forwarding between the target network N1 and the provisioning network N2 with different subnet IDs without a considerable modification in the routing table T2, the routing control unit 23b analyzes the "wireless sub-network (wireless communication network)" defined in the routing table T2 as the provisioning network N2 which is one of the wireless sub-networks and analyzes the "backbone network" as a virtual network.

In the first preferred embodiment, to facilitate understanding, the example in which the target network side processing unit 20a and the provisioning network side processing unit 20b include the memories 24a and 24b, respectively, and the routing tables T1 and T2 are stored in the memories 24a and 24b, respectively, has been described. However, the routing tables T1 and T2 may be stored in one memory shared by the target network side processing unit 20a and the provisioning network side processing unit 20b.

(Packet Transmission Operation of Wireless Communication System)

Figure 5:
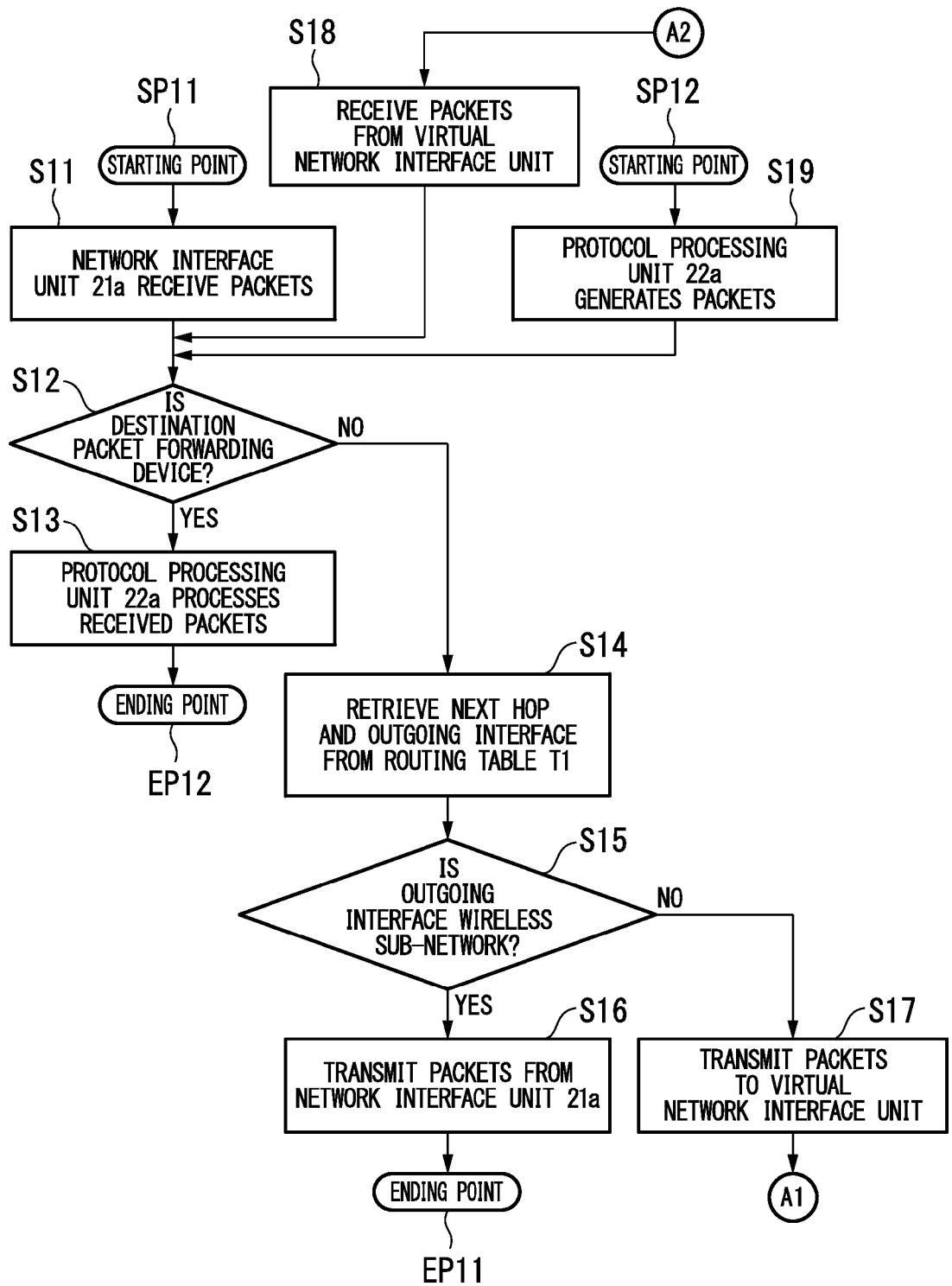
FIG. 5 is a flowchart illustrating a packet forwarding operation of the wireless communication system in accordance with the first preferred embodiment of the present invention.
Figure 6:
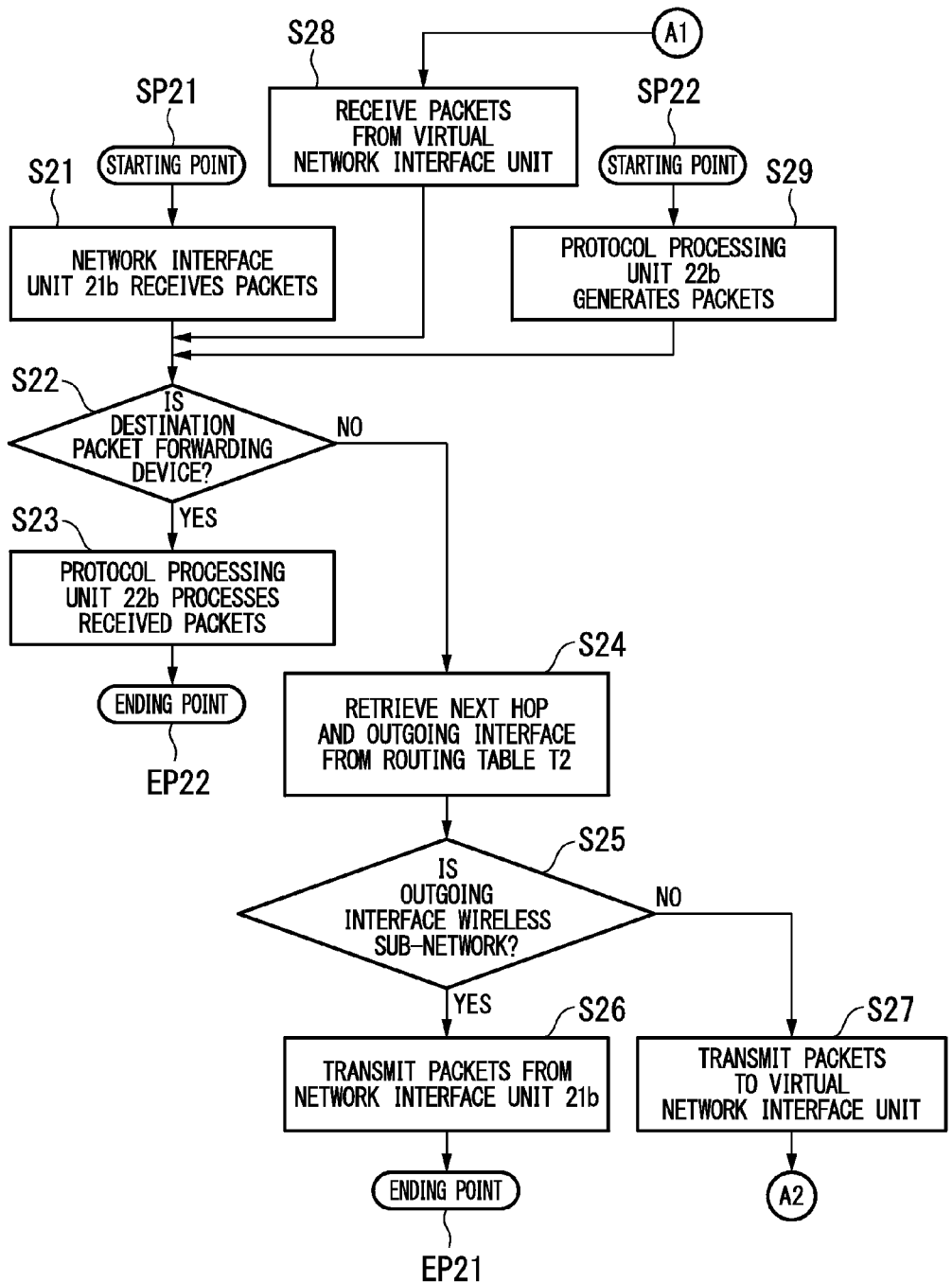
FIG. 6 is a flowchart illustrating a packet forwarding operation of the wireless communication system in accordance with the first preferred embodiment of the present invention.

FIGS. 5 and 6 are flowcharts illustrating packet forwarding operations of the wireless communication system in accordance with the first preferred embodiment of the present invention. The process illustrated in FIG. 5 is a process that is performed on the side of the target network N1 from the virtual network interface unit N3 installed in the packet forwarding device 12. On the other hand, the process illustrated in FIG. 6 is a process that is performed on the side of the provisioning network N2 from the virtual network interface unit N3 installed in the packet forwarding device 12.

A "starting point" illustrated in FIGS. 5 and 6 means a source point of communication and an "ending point" means a destination point of the communication. Specifically, in FIG. 5, a starting point SP11 and an ending point EP11 indicate a source point and a destination point of communication performed by a wireless device participating in the target network N1 or a device connected to the backbone network N. A starting point SP12 and an ending point EP12 indicate a source point and a destination point of communication performed by the protocol processing unit 22a of the packet forwarding device 12. In FIG. 6, a starting point SP21 and an ending point EP21 indicate a source point and a destination point of communication performed by a wireless device participating in the provisioning network N2 and a starting point SP22 and an ending point EP22 indicate a source point and a destination point of communication performed by the protocol processing unit 22b of the packet forwarding device 12.

In the wireless communication system 1, communication in which any one of the four starting points SP11, SP12, SP21, and SP22 illustrated in FIGS. 5 and 6 is set as a source point and any one of the four ending points EP11, EP12, EP21, and EP22 illustrated in FIGS. 5 and 6 is set as a destination point is performed with reference to the flowcharts illustrated in FIGS. 5 and 6. Hereinafter, an operation in a case in which the wireless device 11 participating in the provisioning network N2 transmits packets destined for the system manager 14 will be described as an example. In this case, the starting point SP21 in FIG. 6 is set as the source point of the communication and the ending point EP11 in FIG. 5 is set as the destination point of the communication.

Packets transmitted from the wireless device 11 serving as the starting point SP21 are input to the packet forwarding device 12 via the provisioning network N2 and are received by the network interface unit 21b of the provisioning network side processing unit 20b installed in the packet forwarding device 12 (step S21). With regard to the received packets, the routing control unit 23b determines whether a destination of the packets is the self-device (the packet forwarding device 12) (step S22). Here, since the case in which the packets destined for the system manager 14 are transmitted from the wireless device 11 is considered, the determination result of step S22 is "NO."

When the determination result of step S22 is "NO," a process of retrieving the routing table T2 stored in the memory 24b and obtaining a next hop and an outgoing interface is performed by the routing control unit 23b (step S24). Here, a case in which the packets destined for the system manager 14 are transmitted from the wireless device 11 is considered. Thus, when the destination address is the "system manager" from the routing table T2 illustrated in FIG. 4, the "packet forwarding device (network interface unit 21a) is obtained as a next hop and the "backbone network" is obtained as the outgoing interface.

When the above-described retrieval ends, the routing control unit 23b determines whether the obtained outgoing interface is the "wireless sub-network" (step S25). Here, since the "backbone network" is obtained as the outgoing interface in the process of step S24, the determination result of step S25 is "NO." Then, the routing control unit 23b analyzes the "backbone network" obtained as the outgoing interface as a virtual network, the routing control unit 23b outputs (transmits) the packets to the virtual network interface unit N3 (step S27).

The packets output from the routing control unit 23b of the provisioning network side processing unit 20b to the virtual network interface unit N3 are input to the target network side processing unit 20a and are received by the routing control unit 23a installed in the target network side processing unit 20a (step S18). With regard to the received packets, the routing control unit 23a determines whether a destination of the packets is the self-device (the packet forwarding device 12) (step S12). Here, since the case in which the packets destined for the system manager 14 are transmitted from the wireless device 11 is considered, the determination result of step S12 is "NO."

When the determination result of step S12 is "NO," a process of retrieving the routing table T1 stored in the memory 24a and obtaining a next hop and an outgoing interface is performed by the routing control unit 23a (step S14). Here, a case in which the packets destined for the system manager 14 are transmitted from the wireless device 11 is considered. Thus, when the destination address is the "system manager" from the routing table T1 illustrated in FIG. 3, the "backbone router" is obtained as a next hop and the "wireless sub-network" is obtained as the outgoing interface.

When the above-described retrieval ends, the routing control unit 23a determines whether the obtained outgoing interface is the "wireless sub-network" (step S15). Here, since the "wireless sub-network" is obtained as the outgoing interface in the process of step S14, the determination result of step S15 is "YES." Then, the routing control unit 23a analyzes the "wireless sub-network" obtained as the outgoing interface as the target network N1, and the routing control unit 23a outputs the packets to the network interface unit 21a. Accordingly, the packets are transmitted from the network interface unit 21a to the target network N1 (step S16).

The packets transmitted from the network interface unit 21a are received by the system manager 14 serving as the ending point EP11 sequentially via the target network N1, the backbone router 13, and the backbone network N. Thus, the packets transmitted from the wireless device 11 participating in the provisioning network N2 are received by the system manager 14 via the target network N1 to which a subnet ID different from that of the provisioning network N2 is attached.

In the transmission of the packets destined for the wireless device 11 participating in the provisioning network N2 from the system manager 14, the starting point SP11 in FIG. 5 is the source point of the communication and the ending point EP21 in FIG. 6 is the destination point of the communication. That is, when the processes of steps S11, S12, S14, S15, and S17 in FIG. 5 and the processes of steps S28, S22, S24, S25, and S26 in FIG. 6 are performed in order, the packets transmitted from the system manager 14 are received by the wireless device 11 participating in the provisioning network N2 sequentially via the target network N1 and the provisioning network N2 to which difference subnet IDs are attached.

(Participation Operation in Wireless Communication System)

Next, an operation in a case in which the wireless device 11 or the packet forwarding device 12 is allowed to participate in the above-described wireless communication system 1 will be described. The participation operations in the wireless communication system 1 are broadly classified into (1) an operation of allowing the packet forwarding device 12 to participate in the target network N1 and the provisioning network N2, (2) an operation of allowing the wireless device 11 to participate in the provisioning network N2, and (3) an operation of allowing the wireless device 11 to participate in the target network N1. Hereinafter, the participation processes of the foregoing (1) and (2) will be described.

Figure 7:
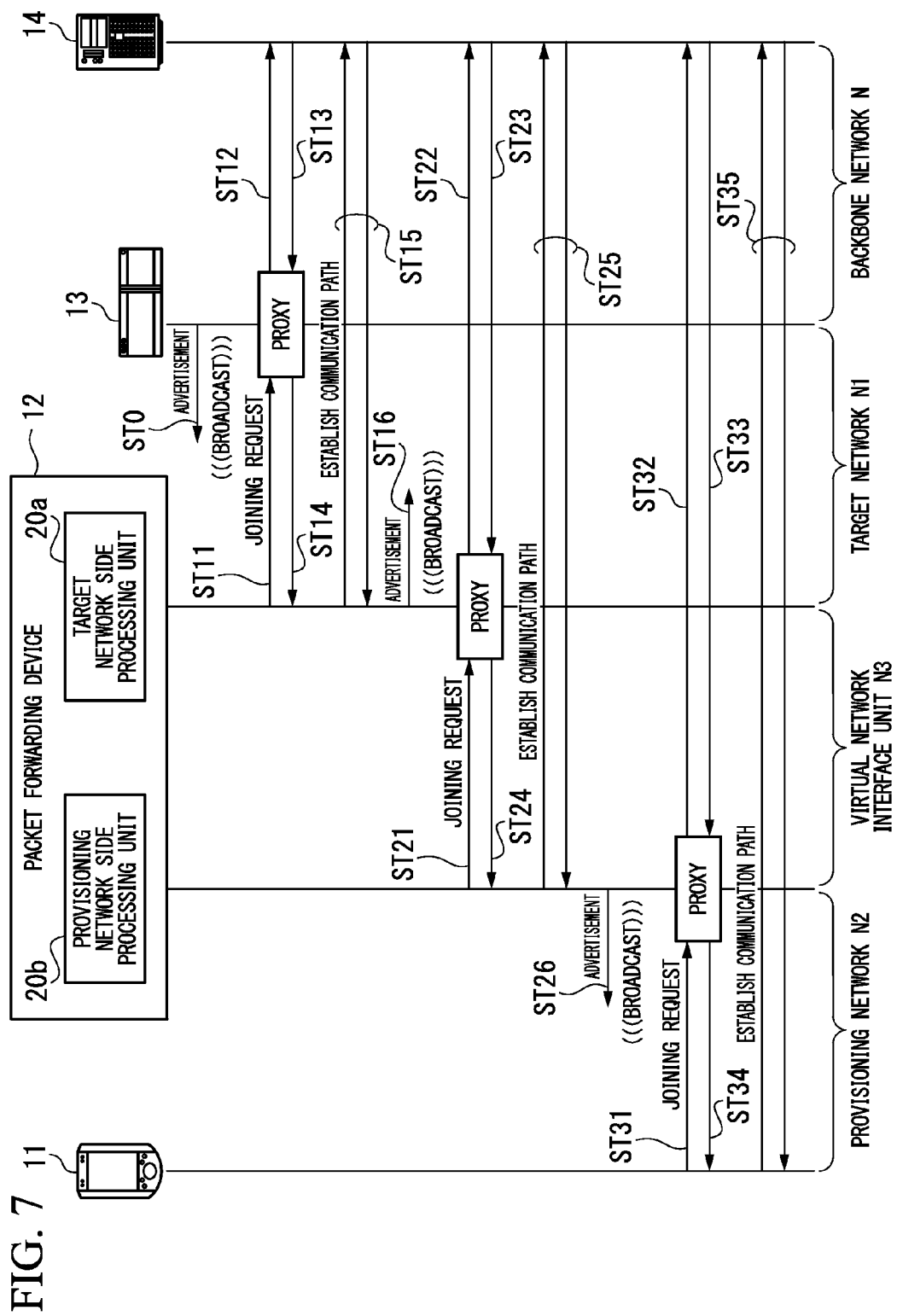
FIG. 7 is a timing chart for describing a participation operation in the wireless communication system in accordance with the first preferred embodiment of the present invention.

FIG. 7 is a timing chart for describing the participation operation in the wireless communication system in accordance with the first preferred embodiment of the present invention. As illustrated in FIG. 7, in the initial state, an advertisement (information used to connect the wireless device 11 or the packet forwarding device 12 to the target network N1) is assumed to be periodically transmitted from the backbone router 13 to the target network N1 under the control of the system manager 14 (ST0). Further, the packet forwarding device 12 is assumed to be installed at a position at which an advertisement transmitted from the backbone router 13 can be received.

When power of the packet forwarding device 12 is turned on, a process of allowing the target network side processing unit 20a of the packet forwarding device 12 to participate in the target network N1 is first performed. Specifically, when an advertisement from the backbone router 13 is received by the target network side processing unit 20a of the packet forwarding device 12, a joining request (request for participating in the target network N1) is transmitted from the target network side processing unit 20a to the backbone router 13 (step ST11).

When the backbone router 13 receives the joining request from the target network side processing unit 20a, the backbone router 13 transmits the joining request from the target network side processing unit 20a to the system manager 14 by proxy via the backbone network N (step ST12). In the transmission of the joining request, the starting point SP12 in FIG. 5 is the source point of the communication and the ending point EP11 in FIG. 5 is the destination point of the communication.

When the system manager 14 receives the joining request transmitted by proxy via the backbone network N, the system manager 14 performs participation authentication on the target network side processing unit 20a and gives a reply (a reply to the joining request) according to the authentication result. The reply from the system manager 14 is transmitted to the backbone router 13 via the backbone network N (step ST13) and is transmitted to the target network side processing unit 20a by proxy by the backbone router 13 (step ST14). In the transmission of the reply, the starting point SP11 in FIG. 5 is the source point of the communication and the ending point EP12 in FIG. 5 is the destination point of the communication.

When the reply from the system manager 14 indicates an intent to permit the participation in the target network N1 (joining success), a communication path is established between the target network side processing unit 20a and the system manager 14 (step ST15). Then, the wireless communication resource of the backbone router 13 located on the communication path is updated by the system manager 14 and setting or the like of the wireless communication resource from the system manager 14 to the target network side processing unit 20a is performed. Further, the communication performed via the foregoing communication path is communication in which the starting point SP11 in FIG. 5 is its source point and the ending point EP12 in FIG. 5 is its destination point and communication in which the starting point SP12 in FIG. 5 is its source point and the ending point EP11 in FIG. 5 is its destination point.

When the foregoing process ends, transmission of an advertisement (first advertisement; information used to connect the wireless device 11 to the target network N1) from the target network side processing unit 20a to the target network N1 starts under the control of the system manager 14 (step ST16). Accordingly, the participation in the target network N1 via the packet forwarding device 12 is enabled. Accordingly, the operation of allowing the target network side processing unit 20a of the packet forwarding device 12 to participate in the target network N1 ends.

Next, an operation of allowing the provisioning network side processing unit 20b of the packet forwarding device 12 to participate in the provisioning network N2 is performed. At this moment, the provisioning network N2 in which the provisioning network side processing unit 20b will participate is not formed and there is no advertisement (information used to connect the wireless device 11 or the packet forwarding device 12 to the provisioning network N2) to the provisioning network N2. For this reason, the provisioning network side processing unit 20b transmits a joining request (request to participate in the provisioning network N2) to the target network side processing unit 20a (step ST21). In the transmission of the joining request, the starting point SP22 in FIG. 6 is the source point of the communication and the ending point EP12 in FIG. 5 is the destination point of the communication.

When the target network side processing unit 20a receives the joining request from the provisioning network side processing unit 20b, the target network side processing unit 20a transmits the joining request from the provisioning network side processing unit 20b to the system manager 14 by proxy via the communication path established in step ST15 (step ST22). In the transmission of the joining request, the starting point SP12 in FIG. 5 is the source point of the communication and the ending point EP11 in FIG. 5 is the destination point of the communication.

When the system manager 14 receives the joining request transmitted by proxy, the system manager 14 performs participation authentication on the provisioning network side processing unit 20b and gives a reply (a reply to the joining request) according to the authentication result. The reply from the system manager 14 is transmitted to the target network side processing unit 20a via the foregoing communication path (step ST23). In the transmission of the reply, the starting point SP11 in FIG. 5 is the source point of the communication and the ending point EP12 in FIG. 5 is the destination point of the communication.

When the replay from the system manager 14 is received by the target network side processing unit 20a, the reply is transmitted to the provisioning network side processing unit 20b by proxy by the provisioning network side processing unit 20b (step ST24). In the proxy transmission of the reply, the starting point SP12 in FIG. 5 is the source point of the communication and the ending point EP22 in FIG. 6 is the destination point of the communication.

When the reply from the system manager 14 indicates an intent to permit the participation in the provisioning network N2 (joining success), a communication path is established between the provisioning network side processing unit 20b and the system manager 14 (step ST25). Then, the wireless communication resources of the backbone router 13 and the target network side processing unit 20a located on the communication path are updated by the system manager 14 and setting or the like of the wireless communication resources from the system manager 14 to the target network side processing unit 20a is performed. The communication performed via the foregoing communication path is communication in which the starting point SP11 in FIG. 5 is its source point and the ending point EP22 in FIG. 6 is its destination point and communication in which the starting point SP22 in FIG. 6 is its source point and the ending point EP11 in FIG. 5 is its destination point.

When the foregoing process ends, transmission of an advertisement (second advertisement; information used to connect the wireless device 11 to the provisioning network N2) from the provisioning network side processing unit 20b to the provisioning network N2 starts under the control of the system manager 14 (step ST26). Accordingly, the provisioning network N2 is formed and the participation in the provisioning network N2 via the packet forwarding device 12 is enabled. Accordingly, the operation of allowing the provisioning network side processing unit 20b to participate in the provisioning network N2 ends.

When the foregoing operations end and the wireless device 11 is allowed to participate in the provisioning network N2, the wireless device 11 is disposed at a position at which the advertisement transmitted from the provisioning network side processing unit 20b of the packet forwarding device 12 can be received. When the wireless device 11 receives the foregoing advertisement, the joining request (a request for participating in the provisioning network N2) is transmitted from the wireless device 11 to the provisioning network side processing unit 20b (step ST31). In the transmission of the joining request, the starting point SP21 in FIG. 6 is the source point of the communication and the ending point EP22 in FIG. 6 is the destination point of the communication.

When the provisioning network side processing unit 20b receives the joining request from the wireless device 11, the provisioning network side processing unit 20b transmits the joining request from the wireless device 11 to the system manager 14 by proxy via the communication path established in step ST25 (step ST32). In the proxy transmission of the joining request, the starting point SP22 in FIG. 6 is the source point of the communication and the ending point EP11 in FIG. 5 is the destination point of the communication.

When the system manager 14 receives the joining request transmitted by proxy, the system manager 14 performs participation authentication on the wireless device 11 and gives a reply (a reply to the joining request) according to the authentication result. The reply from the system manager 14 is transmitted to the provisioning network side processing unit 20b via the foregoing communication path (step ST33) and is transmitted to the wireless device 11 by proxy by the provisioning network side processing unit 20b (step ST34). The transmission of the reply is performed by communication in which the starting point SP11 in FIG. 5 is its source point and the ending point EP22 in FIG. 6 is its destination point and communication in which the starting point SP22 in FIG. 6 is its source point and the ending point EP21 in FIG. 6 is its destination point.

When the reply from the system manager 14 indicates an intent to permit the participation in the provisioning network N2 (joining success), a communication path is established between the wireless device 11 and the system manager 14 (step ST35). Then, the wireless communication resources of the backbone router 13, the target network side processing unit 20a, and the provisioning network side processing unit 20b located on the communication path are updated by the system manager 14 and setting or the like of the wireless communication resources from the system manager 14 to the wireless device 11 is performed. The communication performed via the foregoing communication path is communication in which the starting point SP11 in FIG. 5 is its source point and the ending point EP21 in FIG. 6 is its destination point and communication in which the starting point SP21 in FIG. 6 is its source point and the ending point EP11 in FIG. 5 is its destination point.

Through the foregoing operations, the communication path between the wireless device 11 and the system manager 14 participating in the provisioning network N2 is established by the packet forwarding device 12 participating in both of the target network N1 and the provisioning network N2. Therefore, the system manager 14 can perform the OTA provisioning on the wireless device 11.

Here, an advertisement transmitted from the packet forwarding device 12 will be described. As described above, an advertisement to the target network N1 and an advertisement to the provisioning network N2 are transmitted from the packet forwarding device 12 under the control of the system manager 14. Such advertisements include time synchronization information necessary to perform wireless communication based on the TDMA and information necessary to transmit a joining request as information used for the connection to the network.

The target network N1 and the provisioning network N2 are merely separated logically by different subnet IDs and are not separated physically. For this reason, the packet forwarding device 12 may not transmit an advertisement to each network using the identical communication channel at the identical time. Likewise, a wireless device which will participate in the target network N1 and a wireless device which will participate in the provisioning network N2 may not transmit a joining request to each network using the identical communication channel at the identical time.

Figure 8:
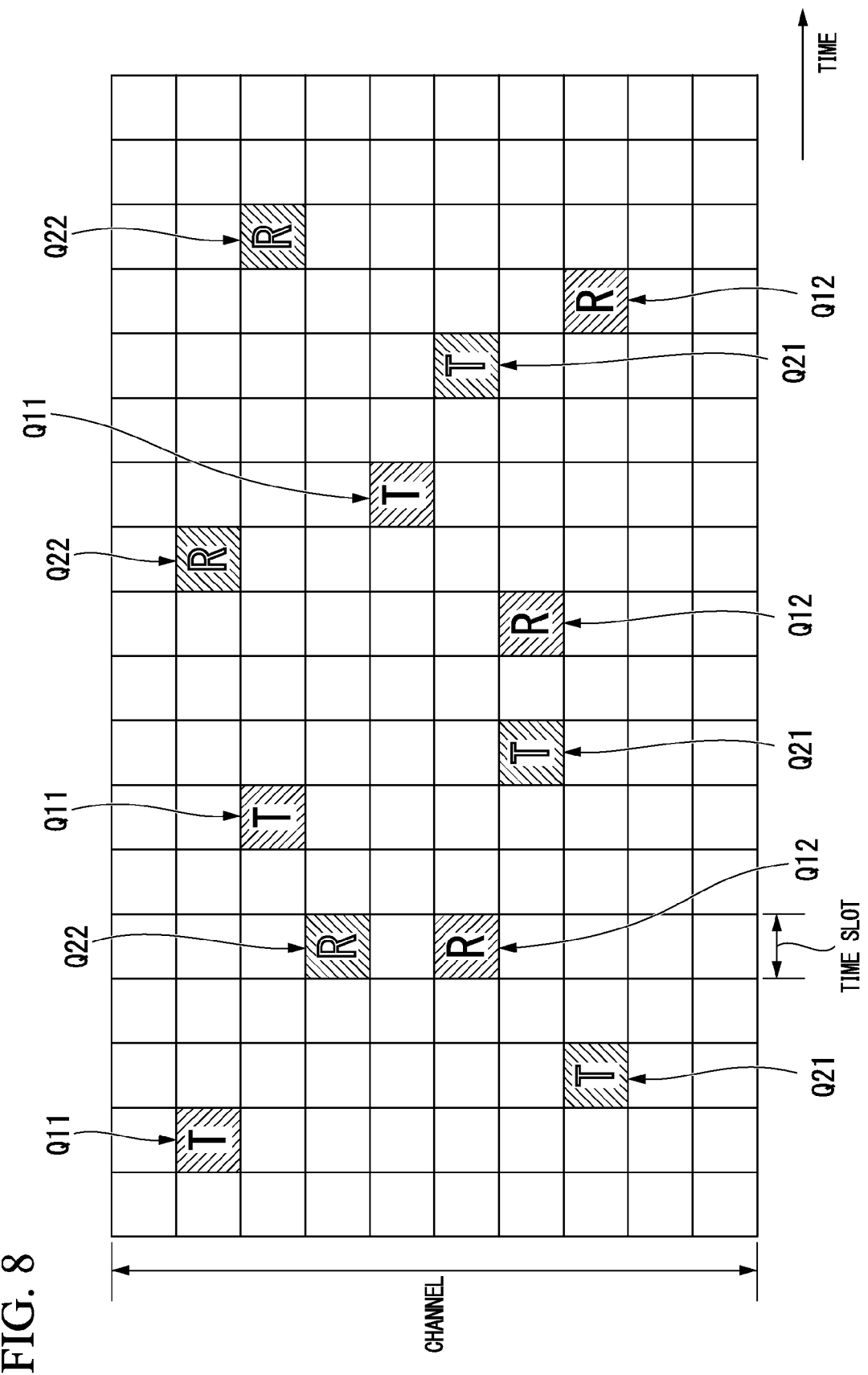
FIG. 8 is a diagram for describing assigned wireless communication resources for advertisements in accordance with the first preferred embodiment of the present invention.

For this reason, the system manager 14 assigns wireless communication resources so that wireless communication resources for the advertisement to the target network N1 and wireless communication resources for the advertisement to the provisioning network N2 do not overlap each other. FIG. 8 is a diagram for describing the assigned wireless communication resources for the advertisements in accordance with the first preferred embodiment of the present invention. In the drawing of FIG. 8, the horizontal axis represents time and the vertical axis represents a communication channel. In FIG. 8, one grid in the horizontal axis direction indicates one time slot and one grid in the vertical axis direction indicates one communication channel. However, to simplify the illustration, only 10 channels are illustrated as communication channels in FIG. 8.

In FIG. 8, grids (grids to which diagonal lines and black characters are given) indicated by reference numerals Q11 and Q12 indicate wireless communication resources assigned based on the advertisement to the target network N1 and grids (grids to which diagonal lines and white characters are given) indicated by reference numerals Q21 and Q22 indicate wireless communication resources assigned based on the advertisement to the provisioning network N2. Further, characters "T" in the grids indicated by reference numerals Q11 and Q21 indicate wireless communication resources for transmission and characters in the grids indicated by reference numerals Q12 and 22 indicate wireless communication resources for reception.

Referring to FIG. 8, all of a grid indicated by reference numeral Q11, a grid indicated by reference numeral Q12, a grid indicated by reference numeral Q21, and a grid indicated by reference numeral Q22 are assumed not to overlap each other. Accordingly, it can be understood that the wireless communication resources are assigned so that the wireless communication resources assigned based on the advertisement to the target network N1 and the wireless communication resources assigned based on the advertisement to the provisioning network N2 do not overlap each other.

The target network side processing unit 20a of the packet forwarding device 12 can perform time synchronization by receiving the advertisement from the backbone router 13 connected to the target network N1, but the provisioning network side processing unit 20b of the packet forwarding device 12 may not perform such time synchronization. This is because a device transmitting the advertisement to the provisioning network N2 is not connected other than the packet forwarding device 12.

Thus, when the target network side processing unit 20a and the provisioning network side processing unit 20b exchange time synchronization information via the virtual network interface unit N3, the time synchronization can be performed between the target network side processing unit 20a and the provisioning network side processing unit 20b. The exchange of the time synchronization information may be performed using a general communication protocol such as a Network Time Protocol (NTP) or may be performed using a dedicated communication protocol. When the target network side processing unit 20a and the provisioning network side processing unit 20b are configured by the same hardware, the time synchronization may be performed using an internal clock used in the packet forwarding device 12 as a reference.

(Routing Information Generation Operation of System Manager)

Figure 9:
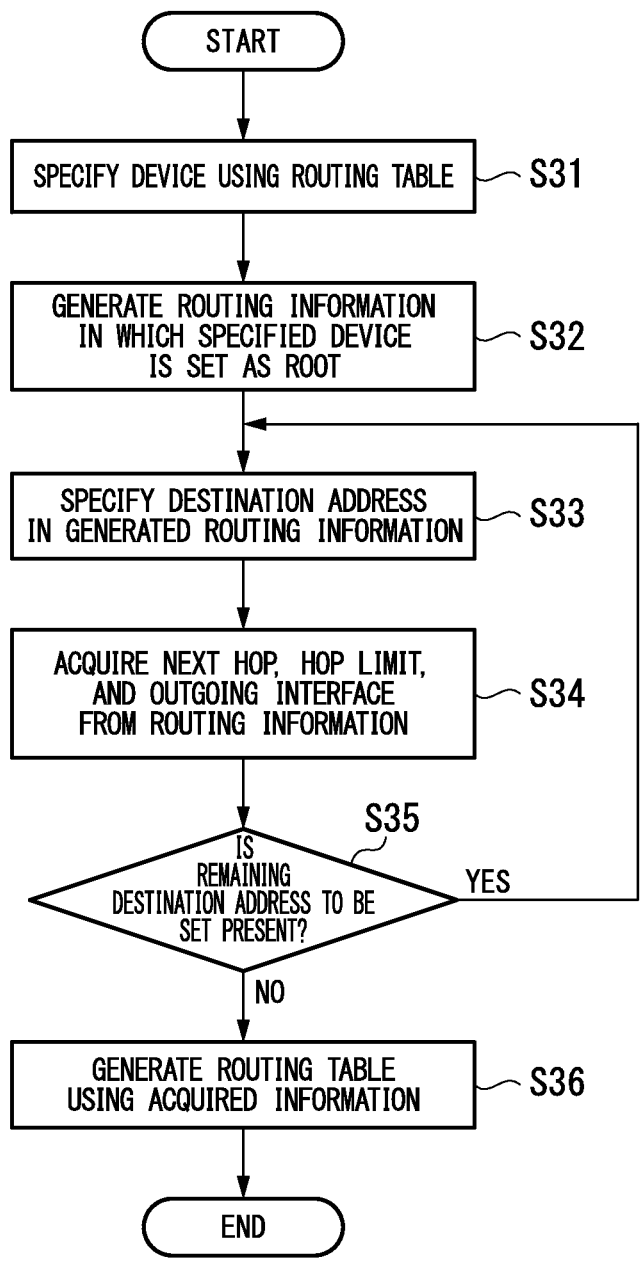
FIG. 9 is a flowchart illustrating a routing table generation operation performed in the first preferred embodiment of the present invention.

Next, a routing information (the routing tables T1 and T2, or the like used in the packet forwarding device 12) generation operation performed by the system manager 14 will be described. FIG. 9 is a flowchart illustrating the operation of generating the routing information (routing table) performed in the first preferred embodiment of the present invention. The process of the flowchart illustrated in FIG. 9 starts, for example, when the wireless communication system 1 is constructed and an operation starts, a joining request is given from the wireless device 11 or the like, or the wireless device 11 participating in the target network N1 performs a communication request.

When the process starts, the system manager 14 first performs a process of specifying a device using the routing information (routing table) (step S31). Specifically, the system manager 14 specifies a device using the routing information (routing table) based on topological information of the wireless communication system 1. Here, to facilitate understanding, the target network side processing unit 20a (network interface unit 21a) of the packet forwarding device 12 is assumed to be specified by the system manager 14.

Figure 10:
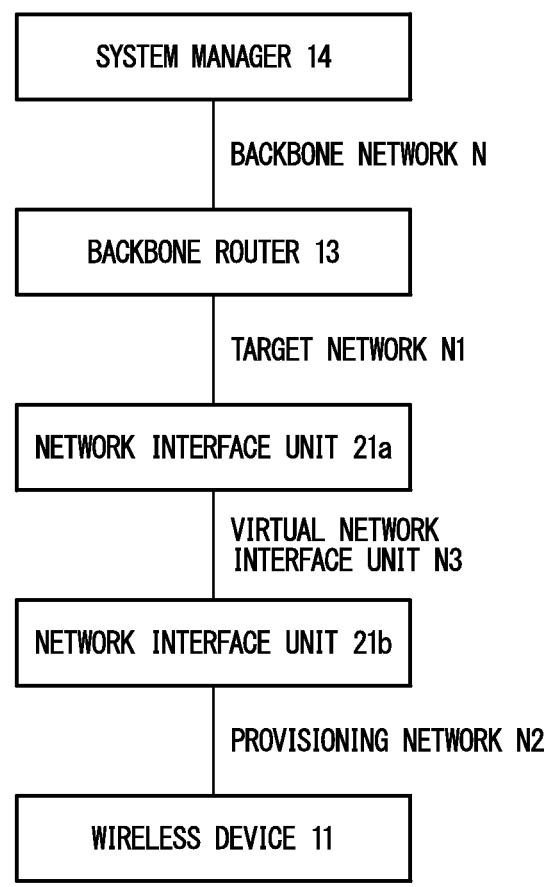
FIG. 10 is a diagram for describing topological information of the wireless communication system in accordance with the first preferred embodiment of the present invention.

Here, the foregoing topological information is information indicating a connection relation between each device included in the wireless communication system 1 and a network installed in the wireless communication system 1 and is information managed in the system manager 14. FIG. 10 is a diagram illustrating the topological information of the wireless communication system in accordance with the first preferred embodiment of the present invention. As illustrated in FIG. 10, the topological information of the wireless communication system 1 is information indicating that the system manager 14 is disposed at the highest level and indicating how the backbone router 13, the target network side processing unit 20a (network interface unit 21a) of the packet forwarding device 12, the provisioning network side processing unit 20b (network interface unit 21b) of the packet forwarding device 12, and the wireless device 11 are connected with respect to the system manager 14 according to the network.

Figure 11A:
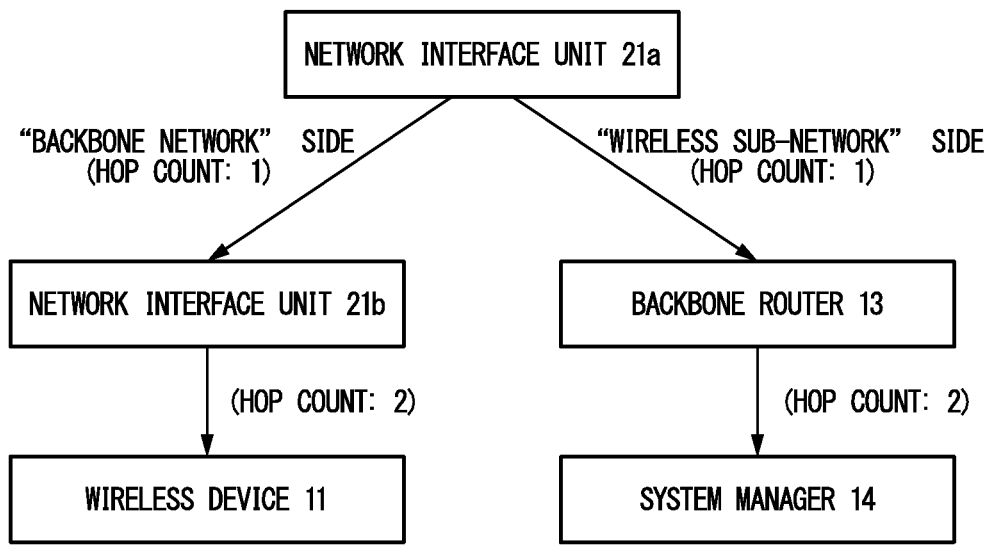
FIG. 11A is a diagram for describing routing information generated in the routing table generation operation in accordance with the first preferred embodiment of the present invention.
Figure 11B:
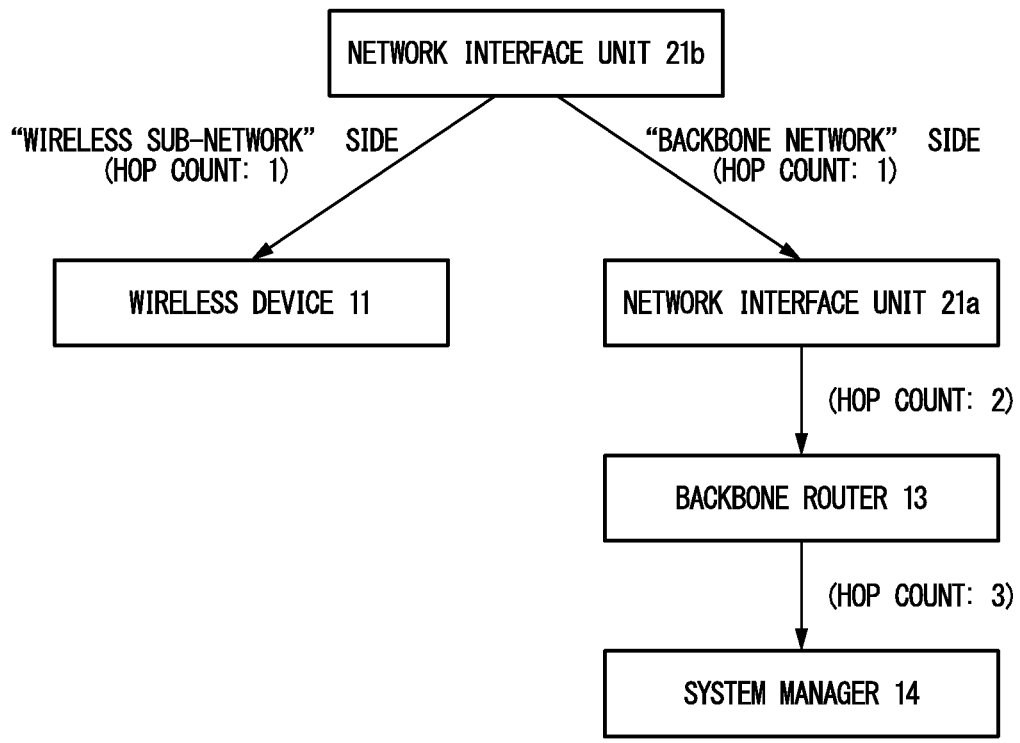
FIG. 11B is a diagram for describing the routing information generated in the routing table generation operation in accordance with the first preferred embodiment of the present invention.

Next, the system manager 14 generates routing information indicating a route up to each device when the device specified in step S31 is set as a root based on the foregoing topological information (step S32). FIGS. 11A and 11B are diagrams for describing the routing information generated in a routing information generation operation in the first preferred embodiment of the present invention. FIG. 11A is a diagram for describing routing information when the target network side processing unit 20a (network interface unit 21a) is set as a root. FIG. 11B is a diagram for describing routing information when the provisioning network side processing unit 20b (network interface unit 21b) is set as a root.

Referring to FIG. 11A, the routing information at the time of the setting of the network interface unit 21a as a root indicates that the network interface unit 21a is disposed at the highest level, the network interface unit 21b and the wireless device 11 are disposed in this order a "backbone network" side, and the backbone router 13 and the system manager 14 are disposed in this order on a "wireless sub-network" side. Further, in the routing information, a relay count (hop count) up to each device is also defined when the network interface unit 21a is set as a root.

Referring to FIG. 11B, the routing information at the time of the setting of the network interface unit 21b as a root indicates that the network interface unit 21b is disposed at the highest level, the network interface unit 21a, the backbone router 13, and the system manager 14 are disposed in this order on the "backbone network" side, and the wireless device 11 is disposed on the "wireless sub-network" side. Further, in the routing information, a relay count (hop count) up to each device is also defined when the network interface unit 21b is set as a root.

Next, the system manager 14 performs a process of setting a destination address (device indicated as the final destination of a packet) in the routing information generated in step S32 (step S33). For example, the system manager 14 is set as the destination address in the routing information described with reference to FIG. 11A. Through this process, a routing in which the network interface unit 21a illustrated in FIG. 11A is set as a source address (device indicated as the originator of a packet) and the system manager 14 is set as a destination address is specified.

Next, the system manager 14 acquires the next hop, the hop limit, and the outgoing interface with reference to the routing information (step S34). Specifically, referring to FIG. 11A, in a route in which the network interface unit 21a is set as the source address and the system manager 14 is set as the destination address, the "backbone router" is acquired as the next hop, "2" is acquired as the hop limit (hop count), and the "wireless sub-network" is acquired as the outgoing interface.

When the foregoing process ends, the system manager 14 determines whether a remaining destination address to be set is present (step S35). When the system manager 14 determines that the remaining destination address to be set is present (when the determination result of step S35 is "YES"), the system manager 14 sets a new destination address (step S33) and acquires the next hop, the hop limit, and the outgoing interface (step S34).

Conversely, when the system manager 14 determines that the remaining destination address to be set is not present (when the determination result of step S35 is "NO"), the system manager 14 generates the routing table T1 illustrated in FIG. 3 using the information acquired in step S34 (step S36). The generated routing table T1 is transmitted to the packet forwarding device 12 and is stored in the memory 24a of the target network side processing unit 20a. Further, it is determined that the remaining destination address to be set is not present, for example, when all of the wireless device 11, the network interface unit 21b, the backbone router 13, and the system manager 14 illustrated in FIG. 11A are set as the destination addresses.

The case in which the routing table T1 used in the target network side processing unit 20a of the packet forwarding device 12 is generated through the routing information (routing table) generation operation performed by the system manager 14 has been described as an example. However, the same operation is performed also when the routing table T2 used in the provisioning network side processing unit 20b is generated. Further, the routing information (routing table) is used not only in the packet forwarding device 12 but also in the backbone router 13. The routing information (routing table) used in the backbone router 13 is also generated basically according to the flowchart illustrated in FIG. 9.

In the first preferred embodiment, as described above, the packet forwarding device 12 including the virtual network interface unit N3, the target network side processing unit 20a, and the provisioning network side processing unit 20b is installed between the target network N1 and the provisioning network N2. In the packet forwarding device 12, the target network side processing unit 20a performs the first routing control using the routing table T1 in which the target network N1 and the virtual network interface unit N3 are defined as the outgoing interfaces and the provisioning network side processing unit 20b performs the second routing control using the routing table T2 in which the provisioning network N2 and the virtual network interface unit N3 are defined as the outgoing interfaces.

Therefore, it is possible to realize the packet forwarding between the target network N1 and the provisioning network N2 to which different subnet IDs are attached without a considerable modification in the routing information (routing table) used in the routing control. Thus, it is possible to realize the packet forwarding between the foregoing networks without a modification in the wireless communication standard. Accordingly, it is possible to realize the OTA provisioning via the target network N1 in the wireless device 11 participating in the provisioning network N2.

Second Preferred Embodiment

Figure 12:
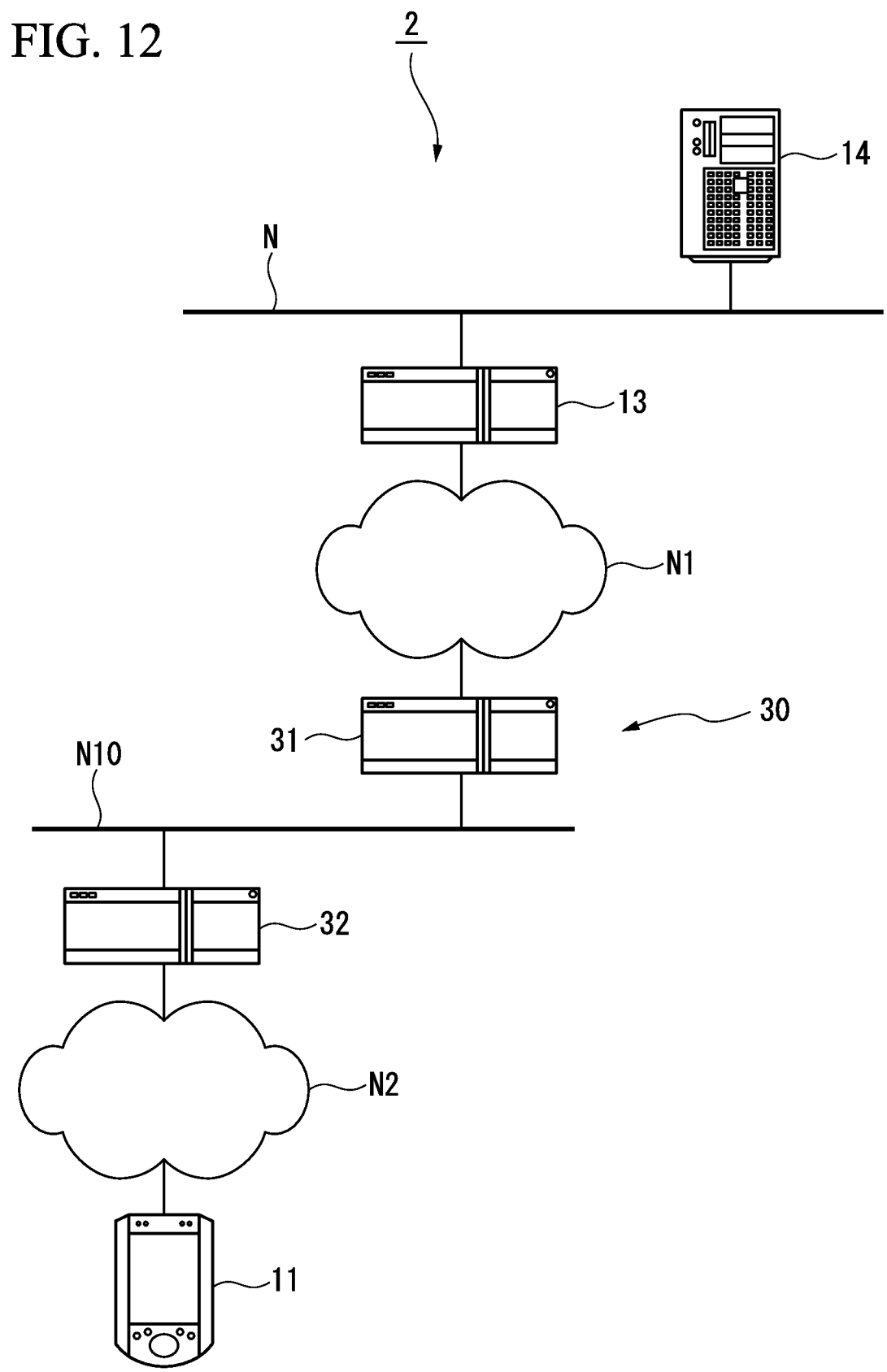
FIG. 12 is a block diagram illustrating an overall configuration of a wireless communication system in accordance with a second preferred embodiment of the present invention.

FIG. 12 is a block diagram illustrating an overall configuration of a wireless communication system in accordance with a second preferred embodiment of the present invention. In FIG. 12, the same reference numerals are given in the same configuration as the configuration illustrated in FIG. 1. As illustrated in FIG. 12, in a wireless communication system 2 in accordance with the second preferred embodiment, the packet forwarding device 12 included in the wireless communication system 1 illustrated in FIG. 1 is configured to be substituted with a packet forwarding device 30.

The packet forwarding device 30 includes an actual network N10 (relay network), a target network side processing device 31 (first processing unit), and a provisioning network side processing device 32 (second processing unit), and thus has the same function as the packet forwarding device 12. That is, the packet forwarding device 30 performs packet forwarding within the target network N1, packet forwarding within the provisioning network N2, and packet forwarding between the target network N1 and the provisioning network N2.

The actual network N10 is any network (for example, Ethernet (registered trademark)). The target network side processing device 31 is connected to the target network N1 and the actual network N10 and performs the same process as the target network side processing unit 20a included in the packet forwarding device 12 illustrated in FIG. 2. The provisioning network side processing device 32 is connected to the provisioning network N2 and the actual network N10 and performs the same process as the provisioning network side processing unit 20b included in the packet forwarding device 12 illustrated in FIG. 2.

That is, in the packet forwarding device 30, the virtual network interface unit N3 included in the packet forwarding device 12 illustrated in FIG. 1 is configured as the actual network N10 such as an existing wired network, and the target network side processing unit 20a and the provisioning network side processing unit 20b included in the packet forwarding device 12 are configured as separate devices (the target network side processing device 31 and the provisioning network side processing device 32).

In the packet forwarding device 30 having the foregoing configuration, the target network side processing device 31 performs first routing control using the same routing information as the routing table T1 illustrated in FIG. 3 and the provisioning network side processing device 32 performs second routing control using the same routing information as the routing table T2 illustrated in FIG. 4. However, the target network side processing device 31 and the provisioning network side processing device 32 analyze the "backbone network" defined in the routing tables T1 and T2 as the actual network N10 and perform the routing control.

As described above, in the wireless communication system 2 in accordance with the second preferred embodiment, the packet forwarding device 12 included in the wireless communication system 1 illustrated in FIG. 1 is substituted with the packet forwarding device 30 that includes the actual network N10, the target network side processing device 31, and the provisioning network side processing device 32. Therefore, the wireless communication system 2 performs the same operations as the wireless communication system 1 illustrated in FIG. 1 and can realize the packet forwarding between the target network N1 and the provisioning network N2 to which different subnet IDs are attached. Accordingly, in the second preferred embodiment, it is also possible to realize the OTA provisioning via the target network N1 in the wireless device 11 participating in the provisioning network N2.

Third Preferred Embodiment

Figure 13:
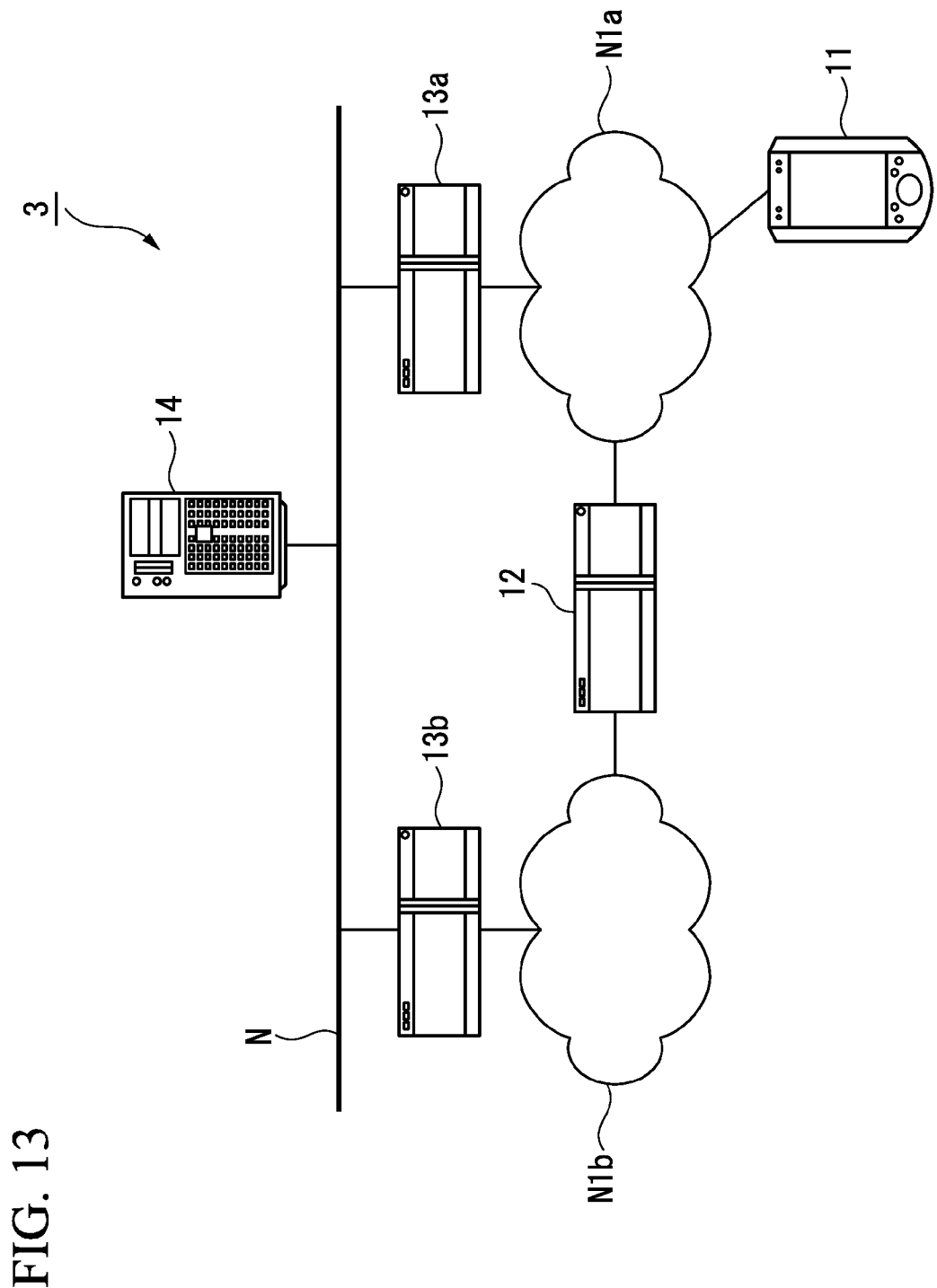
FIG. 13 is a block diagram illustrating an overall configuration of a wireless communication system in accordance with a third preferred embodiment of the present invention.

FIG. 13 is a block diagram illustrating an overall configuration of a wireless communication system in accordance with a third preferred embodiment of the present invention. In FIG. 13, the same reference numerals are given in the same configuration as the configuration illustrated in FIG. 1, as in FIG. 12. As illustrated in FIG. 13, a wireless communication system 3 in accordance with the third preferred embodiment has a configuration in which two backbone routers 13a and 13b are installed to form two target networks N1a and N1b, and the target networks N1a and N1b are connected to a packet forwarding device 12. In the third preferred embodiment, the provisioning network N2 illustrated in FIGS. 1 and 12 is omitted.

The backbone router 13a (first router device) is connected to the target network N1a (first wireless communication network) and a backbone network N and performs wireless communication in conformity with the wireless communication standard, ISA100.11a. The backbone router 13b (second router device) is connected to the target network N1b (second wireless communication network) and the backbone network N and performs wireless communication in conformity with the wireless communication standard, ISA100.11a. The backbone routers 13a and 13b are the same as the backbone router 13 illustrated in FIGS. 1 and 12. Further, different subnet IDs are attached to the target networks N1a and N1b.

The packet forwarding device 12 connects the two target networks N1a and N1b to each other. In the first and second preferred embodiments described above, the packet forwarding device 12 connects the target network N1 to the provisioning network N2. Here, since the target network N1 and the provisioning network N2 are distinguished from each other by the values of the subnet IDs and operate without modification as wireless communication networks in conformity with the wireless communication standard, ISA100.11a, the two target networks N1a and N1b are connected by the packet forwarding device 12 without any problem.

As illustrated in FIG. 13, in the wireless communication system 3 in accordance with the third preferred embodiment, the target networks N1a and N1b are connected to the backbone network N via the backbone routers 13a and 13b and the target networks N1a and N1b are connected to each other by the packet forwarding device 12, so that redundant communication paths are formed. Therefore, even when a failure occurs in the backbone router 13a during the communication between the wireless device 11 participating in the target network N1a and the system manager 14 along the route via the backbone router 13a, the communication can be continued along the route via the packet forwarding device 12 and the backbone router 13b.

(Fourth Preferred Embodiment)

Figure 14:
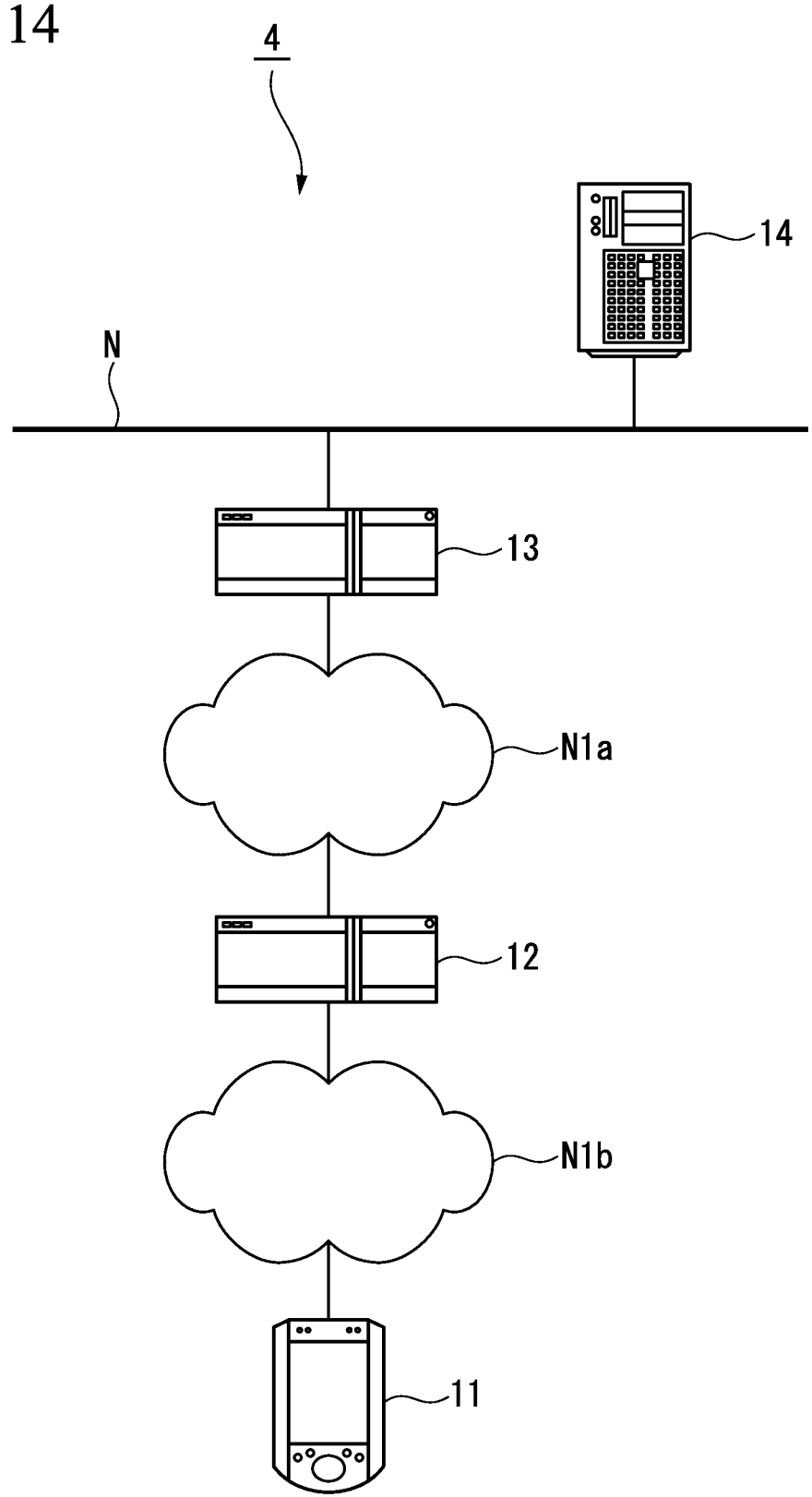
FIG. 14 is a block diagram illustrating an overall configuration of a wireless communication system in accordance with a fourth preferred embodiment of the present invention.

FIG. 14 is a block diagram illustrating an overall configuration of a wireless communication system in accordance with a fourth preferred embodiment of the present invention. In FIG. 14, the same reference numerals are given in the same configurations as the configuration illustrated in FIGS. 1 and 13. As illustrated in FIG. 14, a wireless communication system 4 in accordance with the fourth preferred embodiment has a configuration in which two target networks N1a and N1b are formed instead of the target network N1 and the provisioning network N2 in FIG. 1, and the target networks N1a and N1b are connected to each other by a packet forwarding device 12.

That is, in the wireless communication system 4 in accordance with the fourth preferred embodiment, the two target networks N1a and N1b are formed under one backbone router 13. Further, different subnet IDs are attached to the target networks N1a and N1b. The two target networks N1a and N1b are connected by the packet forwarding device 12 without any problem for the same reason as the reason described in the third preferred embodiment.

In the above-described first preferred embodiment, the target network N1 and the provisioning network N2 are connected by the packet forwarding device 12 in order to realize the OTA provisioning in the wireless device 11. In this preferred embodiment, on the other hand, the two target networks N1a and N1b are connected by the packet forwarding device 12 without considering the provisioning network N2.

By connecting the networks, for example, an operation can be realized such that different security policies are applied to the target networks N1a and N1b connected to each other.

The packet forwarding device and the wireless communication system in accordance with the fourth preferred embodiments of the present invention have been described, but the present invention is not limited to the above-described preferred embodiments and can be freely modified within the scope of the present invention. For example, in the above-described first preferred embodiment, the example in which the virtual network interface unit N3 is installed in the packet forwarding device 12 has been described. However, the actual network N10 described in the second preferred embodiment may be installed instead of the virtual network interface unit N3.

In the foregoing first and second preferred embodiments, the packet forwarding function between the target network N1 and the provisioning network N2 may be activated or stopped, as necessary. For example, the foregoing forwarding function is activated only when the OTA provisioning is performed in the wireless device 11 via the target network N1. After the OTA provisioning ends, the foregoing forwarding function is stopped.

The activation and the stop of the packet forwarding function between the target network N1 and the provisioning network N2 are performed, for example, by supplying and stopping power to the provisioning network side processing unit 20b (or the provisioning network side processing device 32 illustrated in FIG. 12) of the packet forwarding device 12 illustrated in FIG. 2 based on a control signal from the system manager 14. By performing the power control, the power saving can be achieved.

Even when the foregoing supply and stop of the power is performed, the power is continuously supplied to the target network side processing unit 20a (or the target network side processing device 31 illustrated in FIG. 12) of the packet forwarding device 12 illustrated in FIG. 2. Therefore, the packet forwarding device 12 (or the target network side processing device 31) operates as a device (normal wireless router) that forwards packets within the target network N1.

The preferred embodiment of present invention can be applied broadly to a packet forwarding device and a wireless communication system including the packet forwarding device. Thus, it is possible to realize packet forwarding between wireless communication networks without a modification in a wireless communication standard.

What is claimed is:

1. A packet forwarding device that performs forwarding of a packet between first and second wireless communication networks to which different identifiers are attached, the first wireless communication network being connected to a main network, the packet forwarding device comprising:

a relay network that is interposed between the first and second wireless communication networks;

a first processing unit that is connected to the first wireless communication network, the first processing unit performing first routing control by using first routing information in which either one of the main network and a wireless communication network is defined as an outgoing interface for each ending point address of the packet, analyzing the main network defined in the first routing information as the relay network, and analyzing the wireless communication network defined in the first routing information as the first wireless communication network; and a second processing unit that is connected to the second wireless communication network, the second processing unit performing second routing control by using second routing information in which either one of the main network and a wireless communication network is defined as an outgoing interface for each ending point address of the packet, analyzing the main network defined in the second routing information as the relay network, and analyzing the wireless communication network defined in the second routing information as the second wireless communication network.

2. The packet forwarding device according to claim 1, wherein each of the first routing information and the second routing information is a table in which a next hop, a hop limit, and an outgoing interface are defined for each destination address.

3. The packet forwarding device according to claim 1, wherein the relay network is a virtual network which virtually connects the first processing unit to the second processing unit.

4. The packet forwarding device according to claim 1, wherein the relay network is an actual network which physically connects the first processing unit to the second processing unit.

5. The packet forwarding device according to claim 4, wherein the first and second processing units are installed as separate devices, when connected to the relay network.

6. A wireless communication system that performs wireless communication via first and second wireless communication networks to which different identifiers are attached, the wireless communication system comprising:

a control device configured to perform control of the wireless communication performed via the first and second wireless communication networks; and a packet forwarding device that performs forwarding of a packet between first and second wireless communication networks to which different identifiers are attached, the first wireless communication network being connected to a main network, the packet forwarding device comprising:

a relay network that is interposed between the first and second wireless communication networks;

a first processing unit that is connected to the first wireless communication network, the first processing unit performing first routing control by using first routing information in which either one of the main network and a wireless communication network is defined as an outgoing interface for each ending point address of the packet, analyzing the main network defined in the first routing information as the relay network, and analyzing the wireless communication network defined in the first routing information as the first wireless communication network; and a second processing unit that is connected to the second wireless communication network, the second processing unit performing second routing control by using second routing information in which either one of the main network and a wireless communication network is defined as an outgoing interface for each ending point address of the packet, analyzing the main network defined in the second routing information as the relay network, and analyzing the wireless communication network defined in the second routing information as the second wireless communication network.

7. The wireless communication system according to claim 6, wherein the control device is configured to generate the first routing information and the second routing information used in the first and second processing units based on information indicating connection relations between the first and second wireless communication networks, and the relay network and the first and second processing units of the packet forwarding devices.

8. The wireless communication system according to claim 6, further comprising:
a first router device that is connected to a core network to which the control device is connected and the first wireless communication network.

9. The wireless communication system according to claim 8, further comprising:
a second router device that is connected to the core network and the second wireless communication network.

10. The wireless communication system according to claim 6, wherein
the first wireless communication network is a currently used wireless communication network in which a participating wireless device performs wireless communication under control of the control device, and
the second wireless communication network is an auxiliary wireless communication network in which participation information necessary to allow the wireless device to participate in the first wireless communication network is set in the wireless device to be allowed to participate in the first wireless communication network.

11. The wireless communication system according to claim 10, wherein the control device is configured to perform a participation process of allowing the wireless device to participate in the first and second wireless communication networks and a setting process of setting the participation information on the wireless device participating in the second wireless communication network.

12. The wireless communication system according to claim 6, wherein both of the first and second wireless communication networks are currently used wireless communication networks in which the participating wireless device performs the wireless communication under control of the control device.

13. The wireless communication system according to claim 6, wherein
the first processing unit of the packet forwarding device transmits information used to connect the wireless device to the first wireless communication network as a first advertisement to the first wireless communication network under control of the control device, and
the second processing unit of the packet forwarding device transmits information used to connect the wireless device to the second wireless communication network as a second advertisement to the second wireless communication network under the control of the control device.

* * * * *